United States Patent
Lee et al.

(10) Patent No.: US 12,500,243 B2
(45) Date of Patent: Dec. 16, 2025

(54) ELECTRODE AND RECHARGEABLE LITHIUM BATTERY INCLUDING THE SAME

(71) Applicant: SAMSUNG SDI CO., LTD., Yongin-si (KR)

(72) Inventors: Jinhee Lee, Yongin-si (KR); Hyo-Jung Song, Yongin-si (KR); Minjae Kim, Yongin-si (KR); Mihwa Yang, Yongin-si (KR); Kyoseon Koo, Yongin-si (KR); Jeunggi Moon, Yongin-si (KR); Duckjae You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 506 days.

(21) Appl. No.: 18/159,048

(22) Filed: Jan. 24, 2023

(65) Prior Publication Data
US 2023/0246200 A1    Aug. 3, 2023

(30) Foreign Application Priority Data
Jan. 28, 2022   (KR) .................. 10-2022-0013666

(51) Int. Cl.
*H01M 4/66*   (2006.01)
*H01M 4/62*   (2006.01)

(52) U.S. Cl.
CPC ........... *H01M 4/667* (2013.01); *H01M 4/623* (2013.01)

(58) Field of Classification Search
None
See application file for complete search history.

(56) References Cited

U.S. PATENT DOCUMENTS

| 2005/0118508 A1 | 6/2005 | Yong et al. |
| 2009/0305141 A1 | 12/2009 | Lee et al. |
| 2019/0296306 A1 | 9/2019 | Sugizaki et al. |

(Continued)

FOREIGN PATENT DOCUMENTS

| EP | 3 544 084 A1 | 9/2019 |
| EP | 3 591 735 A1 | 1/2020 |

(Continued)

OTHER PUBLICATIONS

Extended European Search Report Corresponding to EP 23153310.8, dated Jun. 20, 2023, 8 pages.

*Primary Examiner* — Daniel P Malley, Jr.
(74) *Attorney, Agent, or Firm* — Womble Bond Dickinson (US) LLP

(57) ABSTRACT

An electrode including a current collector; an electrode active material layer on a surface of the current collector and including internal pores; an inner coating layer filled in the internal pores of the electrode active material layer and including an adhesive material; and an outer coating layer disposed on a surface of the electrode active material layer and including an adhesive material. A total weight of the inner coating layer and the outer coating layer per area of one surface of the current collector is about 0.1 g/m² to about 0.7 g/m². In addition, the electrode active material layer has a porosity of about 13% to about 16% in a cross section having a depth of about 20 μm from the surface of the electrode active material layer to the current collector.

18 Claims, 6 Drawing Sheets

(56) References Cited

U.S. PATENT DOCUMENTS

2020/0006731 A1    1/2020   Tokuno et al.
2024/0145765 A1*   5/2024   Mukai ................... H01M 4/366

FOREIGN PATENT DOCUMENTS

| KR | 10-2005-0043674 A | 5/2005 |
| KR | 10-2007-0092621 A | 9/2007 |
| KR | 10-2016-0042666 A | 4/2016 |
| KR | 10-2016-0042674 A | 4/2016 |
| KR | 10-2016-0051199 A | 5/2016 |

* cited by examiner

ELECTRODE AND RECHARGEABLE LITHIUM BATTERY INCLUDING THE SAME

CROSS-REFERENCE TO RELATED APPLICATION

This application claims priority to and the benefit of Korean Patent Application No. 10-2022-0013666, filed in the Korean Intellectual Property Office on Jan. 28, 2022, the entire content of which is incorporated herein by reference.

BACKGROUND

Field

Embodiments of the present disclosure described herein are related to an electrode and a rechargeable lithium battery including the same.

Description of the Related Art

A portable information device such as a cell phone, a laptop, smart phone, and/or the like or an electric vehicle has utilized a rechargeable lithium battery having high energy density and easy portability as a driving power source. Recently, research has been actively conducted to utilize a rechargeable lithium battery with high energy density as a driving power source or power storage power source for hybrid and/or electric vehicle(s).

However, it is difficult to suppress or reduce the expansion of the electrode (particularly, the negative electrode) a rechargeable lithium battery while ensuring the adhesive force between the electrode-separator while driving the rechargeable lithium battery having a high energy density.

SUMMARY

Aspects of embodiments of the present disclosure are directed toward an electrode and a rechargeable lithium battery including the same, which may minimize or reduce battery performance degradation by suppressing expansion of the electrode while securing adhesive force between an electrode-separator while driving a rechargeable lithium battery having a high energy density.

Additional aspects will be set forth in part in the description which follows and, in part, will be apparent from the description, or may be learned by practice of the presented embodiments of the disclosure.

According to one or more embodiments, an electrode includes a current collector; an electrode active material layer on one or both (e.g., opposite) surfaces of the current collector and including internal pores; an inner coating layer filled in the internal pores of the electrode active material layer and including an adhesive material; and an outer coating layer disposed on the surface of the electrode active material layer and including an adhesive material that is the same as or different from the inner coating layer. A total weight of the inner coating layer and the outer coating layer per area of one surface of the current collector is about 0.1 $g/m^2$ to about 0.7 $g/m^2$. In some embodiments, the electrode active material layer has a porosity of about 13% to about 16% in a cross section having a depth of about 20 μm from the surface of the electrode active material layer to the current collector.

In another embodiment, a rechargeable lithium battery includes an electrolyte while including the electrode of the embodiment as at least one of a positive electrode or a negative electrode.

In the electrode and the rechargeable lithium battery including the same according to an embodiment, while the adhesive force between the electrode and the separator is secured at an excellent or suitable level during operation, expansion of the electrode is suppressed or reduced, and thus battery performance degradation may be minimized or reduced.

DETAILED DESCRIPTION

Figure 1:
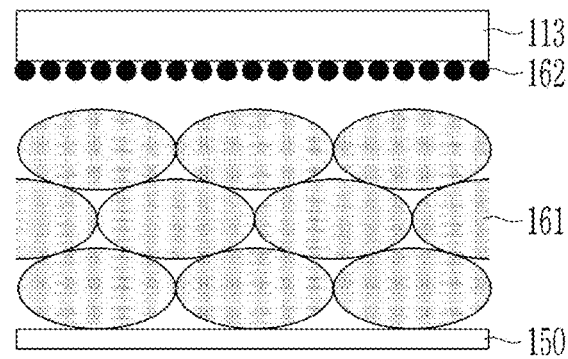
FIG. 1 is a simplified view of an assembly in which an adhesive material is coated on a separator and an electrode is attached to the coated surface.

Hereinafter, specific embodiments will be described in more detail so that those of ordinary skill in the art can easily implement them. However, this disclosure may be embodied in many different forms and is not construed as limited to the example embodiments set forth herein.

The terminology utilized herein is utilized to describe embodiments only, and is not intended to limit the present disclosure. The singular expression includes the plural expression unless the context clearly dictates otherwise.

As utilized herein, "combination thereof" refers to a mixture, laminate, composite, copolymer, alloy, blend, reaction product, and/or the like of the constituents.

Herein, it should be understood that terms such as "includes," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., are exaggerated for clarity and like reference numerals designate like elements throughout, and duplicative descriptions thereof may not be provided the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

"Layer" herein includes not only a shape formed on the whole surface when viewed from a plan view, but also a shape formed on a partial surface.

The "particle diameter" or "average particle diameter" may be measured by a method well suitable to those skilled in the art, for example, may be measured by a particle size analyzer, or may be measured by a transmission electron micrograph or a scanning electron micrograph. In some embodiments, it is possible to obtain an average particle diameter value by measuring utilizing a dynamic light scattering method, performing data analysis, counting the number of particles for each particle size range, and calculating from this. Unless otherwise defined, the average particle diameter may refer to the diameter (D50) of particles having a cumulative volume of 50 volume % in the particle size distribution.

"Thickness" may be measured through a picture taken with an optical microscope such as a scanning electron microscope.

The "total weight of the inner coating layer and the outer coating layer per area of one surface of the current collector" refers to a total loading amount of the electrode "coating material" per unit area (1 $m^2$) of one surface of the current collector, and a total weight of the inner coating layer and the outer coating layer. Herein, the "coating material" refers to a solid content (e.g., amount) excluding a solvent in a solution for forming a coating layer, and includes an adhesive material, and in some cases may further include a filler.

The "porosity in a cross section having a depth of "n (number) μm (e.g., 20 μm)" from the surface of the electrode active material layer to the current collector", "porosity according to the depth of the electrode active material layer", etc. may refer to porosity at a specific depth cross section. For example, it may refer to a volume-based porosity when measuring a depth increasing in the direction from the surface of the electrode active material layer to the current collector and when measuring the porosity at a specific point of a certain cross section by setting the depth to 'n μm.'

Electrode

In an embodiment, an electrode includes a current collector; an electrode active material layer on one or both (e.g., opposite) surfaces of the current collector and including internal pores; an inner coating layer filled in the internal pores of the electrode active material layer and including an adhesive material; and an outer coating layer disposed on the surface of the electrode active material layer and including an adhesive material that is the same as or different from the inner coating layer. A total weight of the inner coating layer and the outer coating layer per area of one surface of the current collector is about 0.1 $g/m^2$ to about 0.7 $g/m^2$. In some embodiments, the electrode active material layer has a porosity of about 13% to about 16% in a cross section having a depth of about 20 μm from the surface of the electrode active material layer to the current collector.

In general, in order to secure an adhesive force between the electrode and the separator, an adhesive material 162 is coated on the separator 113 as shown in FIG. 1, and the electrode is attached to the coated surface. However, when an adhesive material is coated on the separator, the adhesive material penetrating into the internal pores of the separator acts as a resistance, which causes deterioration of battery performance.

Figure 2:
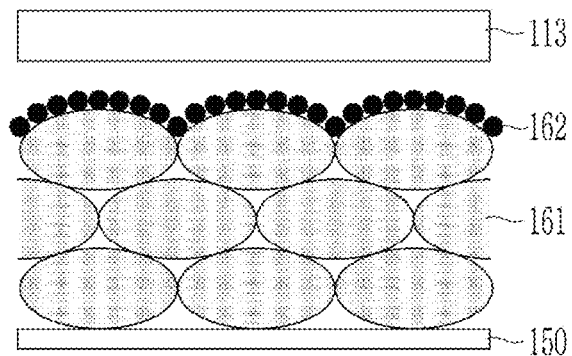
FIGS. 2 and 3 are each a schematic view of an assembly in which a separator is attached to a coating surface of an electrode according to an embodiment of the present disclosure.
Figure 3:
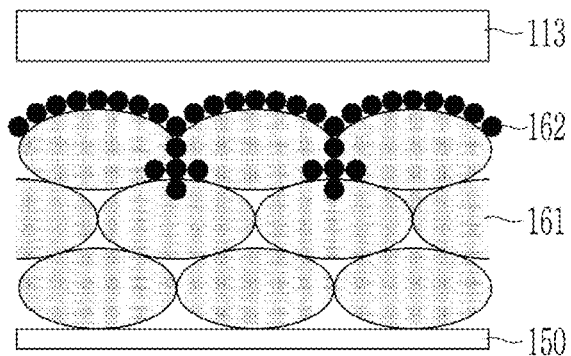

On the other hand, in the embodiment, an adhesive material is coated on the electrode as shown in FIG. 2 or 3, and a separator is attached to the coated surface. For example, the electrode according to an embodiment may be manufactured by forming an electrode active material 161 layer on one surface or both (e.g., opposite) of surfaces of a current collector 150, spraying an aqueous solution including an adhesive material 162 (hereinafter, in some cases, the "an aqueous solution including an adhesive material" is referred to as "a solution for forming a coating layer") on the electrode active material layer through electrospinning, and drying and roll-pressing it.

For example, when the aqueous solution including the adhesive material is sprayed through the electrospinning, the adhesive material may be deposited on the surface of the electrode active material layer to form an outer coating layer and concurrently (e.g., simultaneously), filled in internal pores of the electrode active material layer to form an inner coating layer. However, when the adhesive material is coated on the separator in a general method, the adhesive material may not be filled in the internal pores of the electrode active material layer.

In particular, the porosity of the inner coating layer formed by the electrospinning may vary according to a depth from the surface of the electrode active material layer to the current collector. This is mainly distinguished from a die coating that can form a coating layer only on the surface of the electrode active material layer, and a dip coating that completely fills the internal pores without a gradient depending on the depth of the electrode active material layer.

For example, when the electrospinning is adopted to spray the aqueous solution including the adhesive material, a spring back of the electrode active material layer occurs at a local site in contact with the aqueous solution including the adhesive material, releasing some stress of the electrode active material layer and concurrently (e.g., simultaneously), generating the internal pores of the electrode active material layer or increasing a size of the internal pores. Herein, when the aqueous solution including the adhesive material is sprayed through the electrospinning, the aqueous solution including the adhesive material is sprayed in a different amount according to a depth of the electrode active material layer. This refers to that porosity of the electrode active material varies according to the depth of the electrode active material layer.

Hereinafter, the electrode of the embodiment will be described in more detail.

Electrode Design Criteria

As the total weight of the inner coating layer and the outer coating layer per area of one surface of the current collector increases, the overall porosity of the electrode active material layer increases, but the electrode expansion rate according to the full charge (SOC 100%) of the rechargeable lithium battery is the same. Rather, as the total weight of the inner coating layer and the outer coating layer per area of one surface of the current collector increases, resistance of the electrode increases, so that initial discharge capacity of a rechargeable lithium battery may decrease.

Accordingly, the present inventors have designed an electrode according to an embodiment with comprehensive consideration to a porosity of the electrode active material layer, an expansion rate of the electrode, an adhesive force between electrode and separator, a resistance of the electrode, an initial discharge capacity of the rechargeable lithium battery, and/or the like.

For example, the electrode of an embodiment is formed by adopting the electrospinning to control the total weight of the inner coating layer and the outer coating layer (after drying) per one surface of the current collector in a range of about 0.1 $g/m^2$ to about 0.7 $g/m^2$ and concurrently (e.g., simultaneously), control porosity of the electrode active material layer in a range of about 13% to about 16% in a cross section having a depth of about 20 μm from the surface of the electrode active material layer to the current collector. In this way, when the total weight and the porosity of the adhesive material are controlled or selected, an excellent or suitable adhesive force between the electrode and separator is secured, while the rechargeable lithium battery is driven, and the electrode is suppressed from increasing its expansion and resistance, which minimizes or reduces performance deterioration of the rechargeable lithium battery such as initial discharge capacity and/or the like.

Porosity According to Depth of Electrode Active Material Layer

Figure 4:
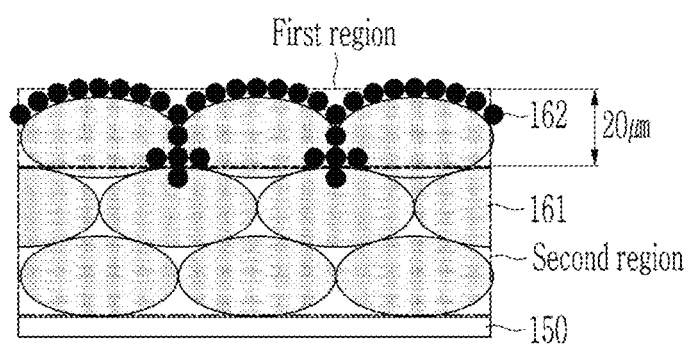
FIG. 4 is a schematic view of an electrode according to an embodiment of the present disclosure.

FIG. 4 is a schematic view of an electrode according to an embodiment.

As shown in FIG. 4, the electrode active material layer may have different porosity depending on the depth thereof. For example, the electrode active material layer may have a different porosity gradient depending on the depth, with a cross section having a depth of about 20 μm from the surface of the electrode active material layer to the current collector as a boundary. This will be described in more detail.

First, the electrode active material layer may have a gradually increased porosity as the depth increases, from the surface of the electrode active material layer to a region (hereinafter referred to as the "first region") reaching the cross section having a depth of about 20 μm to the current collector.

For example, in the region close to the surface of the electrode active material layer, as the depth is smaller, a distribution of the electrode active material may be higher and a filling rate of the adhesive material sprayed utilizing the electrospinning may be relatively low. Moreover, the porosity of the cross section close to the surface of the electrode active material layer may be reduced by the compression process among a series of processes for manufacturing the electrode of the embodiment. Accordingly, in the first region, the filling rate and porosity of the adhesive material may gradually increase as the depth increases.

More specifically, the electrode active material layer may have a porosity of about 10% to about 12% in a cross section having a depth of about 10 μm from the surface of the electrode active material layer to the current collector.

On the other hand, the electrode active material layer may have a porosity maintained within the range of about 13% to about 16% in a cross section having a depth of 20 μm from the surface of the electrode active material layer to the current collector (that is, a lower region of the first region, hereinafter referred to as a "second region").

For example, in the region away from the surface of the electrode active material layer, the distribution of the electrode active material according to the depth is low, and the effect of the compression process is insignificant. Accordingly, in the second region, there may be little change in the filling rate and porosity of the adhesive material as the depth increases.

More specifically, the electrode active material layer may have a porosity of about 13% to about 16% in a cross section having a depth of about 20 μm from the surface of the electrode active material layer to the current collector.

On the other hand, when the depth from the surface of the electrode active material layer to the current collector is the same, as the total weight of the inner coating layer and the outer coating layer per area of one surface of the current collector increases, the porosity may gradually increase.

For example, the porosity of the cross section having a depth of about 20 μm from the surface of the electrode active material layer to the current collector may be about 15% to about 16% when the total weight of the inner coating layer and the outer coating layer per area of one surface of the current collector is about 0.5 g/m² to about 0.7 g/m², may be about 14% to about 15% when the total weight of the inner coating layer and the outer coating layer per area of one surface of the current collector is about 0.3 g/m² to about 0.5 g/m², and may be about 13% to about 14% when the total weight of the inner coating layer and the outer coating layer per area of one surface of the current collector is about 0.1 g/m² to about 0.3 g/m².

Considering comprehensively that as the total weight of the inner coating layer and the outer coating layer per area of one surface of the current collector increases, an adhesive force between the electrode and the separator increases, but when the adhesive material blocks pores on the surface of the electrode, it can function as a resistance, there is an advantage as the total weight of the inner coating layer and the outer coating layer per area of one surface of the current collector is lower within the above range.

Outer Coating Layer

A thickness of the outer coating layer may be about 0.5 μm to about 2 μm, and there is an advantage in that it is possible to minimize or reduce an expansion of the electrode that may occur in the coating process while satisfying the adhesion between the electrode and the separator in this range.

Method of Forming Inner Coating Layer and Outer Coating Layer

The inner coating layer and the outer coating layer may be formed by electrospinning, so that the adhesive material included in the inner coating layer and the adhesive material included in the outer coating layer may be the same. For example, the electrospinning may be performed by electrospinning of an aqueous solution including the adhesive material under conditions of a flow rate of about 1.0 mL/min to about 5.0 mL/min, a progress rate of about 400 cm/min to about 1000 cm/min, and a voltage of about 30 kV to about 50 kV.

The adhesive material is not particularly limited as long as it is a material capable of attaching the electrode and the separator of the embodiment, but the adhesive material may include an acryl-based polymer. In some embodiments, the adhesive material may be a particle type or kind, and the D50 particle diameter of the particle type or kind adhesive material may be about 350 nm to about 650 nm, about 400 nm to about 600 nm, or about 450 nm to about 550 nm.

The aqueous solution including the adhesive material may further include a fluorine-based polymer as a filler in order to improve mechanical properties of the outer coating layer and the inner coating layer. Accordingly, the inner coating layer and the outer coating layer may further include a filler, respectively. The filler may be a particle type or kind, and the D50 particle diameter of the particle type or kind filler may be about 100 nm to about 400 nm, about 150 nm to about 350 nm, or about 200 nm to about 300 nm.

Thickness of Electrode Active Material Layer

The electrode active material layer may have a thickness of about 50 μm to about 150 μm, about 60 μm to about 130 μm, or about 65 μm to about 110 μm, which may be a thickness per one surface of the current collector. Among the thickness of the electrode active material layer, in the region (first region) from the surface of the electrode active material layer to the cross section having a depth of about 20 μm toward the current collector, the porosity gradually increases as the depth increases and in the lower region (second region) of the cross-section having a depth of about 20 μm from the surface of the electrode active material layer to the current collector, there may be little change in the filling rate and porosity of the adhesive material as the depth increases. Detailed descriptions thereof may each independently be the same as described above.

Components of Electrode Active Material Layer

The electrode active material layer may include an electrode active material having a D50 particle diameter of about 10 µm to about 20 µm. The electrode active material layer may further include a conductive material, a binder, or a combination thereof. Detailed descriptions of the electrode active material, the conductive material, the binder, and/or the like will be described later.

Expansion Rate of Electrode

The electrode of the embodiment may have a low electrode expansion rate according to a full charge (SOC 100%) of a rechargeable lithium battery, compared to a case in which an adhesive material is coated on the separator. For example, the electrode of one embodiment may satisfy Equation 1:

$$100\%*([T_B]-[T_A])/[T_A] \leq 20\% \qquad \text{[Equation 1]}$$

In Equation 1, $[T_A]$ is an initial thickness of the electrode; and $[T_B]$ is a thickness of the electrode after the state of charge (SOC) of a rechargeable lithium battery including the electrode reaches 100%.

The upper limit of Equation 1 may be less than or equal to about 20%, less than or equal to about 19%, less than or equal to about 18%, less than or equal to about 17%, or less than or equal to about 16%. However, when a rechargeable lithium battery is manufactured by coating an adhesive material on the separator and then attaching an electrode, the upper limit of Equation 1 is exceeded. The lower limit of Equation 1 is not particularly limited, but may be greater than or equal to about 10%, greater than or equal to about 12%, or greater than or equal to about 14%.

Type (Kind) of Electrode

The electrode of an embodiment may be a negative electrode. The expansion problem of the negative electrode rather than the positive electrode is emerging, and in this regard, the electrode of the embodiment may be usefully utilized to suppress or reduce the expansion problem of the negative electrode.

Rechargeable Lithium Battery

In another embodiment, a rechargeable lithium battery includes a positive electrode; a negative electrode; and an electrolyte, wherein at least one of the positive electrode and the negative electrode is the aforementioned negative electrode according to an embodiment.

This is because the electrode of the embodiment is included as at least one of the positive electrode and the negative electrode, so that an adhesive force between the electrode and the separator may be ensured at an excellent or suitable level even during driving, while the expansion of the electrode may be suppressed or reduced, thereby minimizing or reducing the degradation of battery performance.

Figure 5:
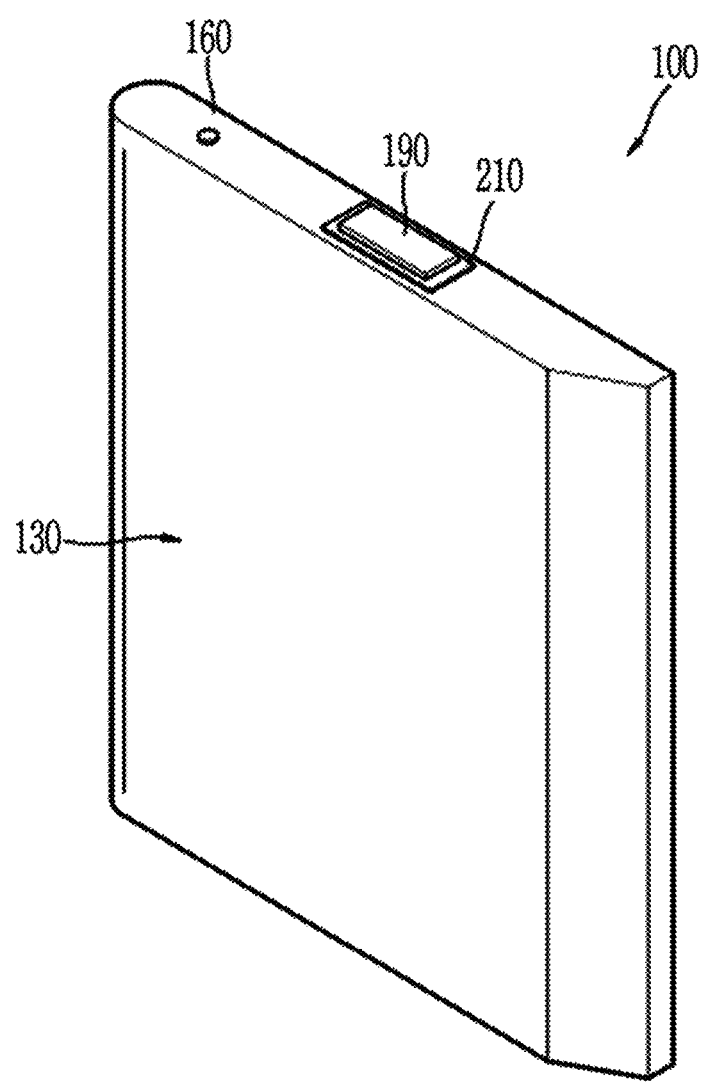
FIG. 5 is a perspective view illustrating a rechargeable lithium battery according to an embodiment of the present disclosure.
Figure 6:
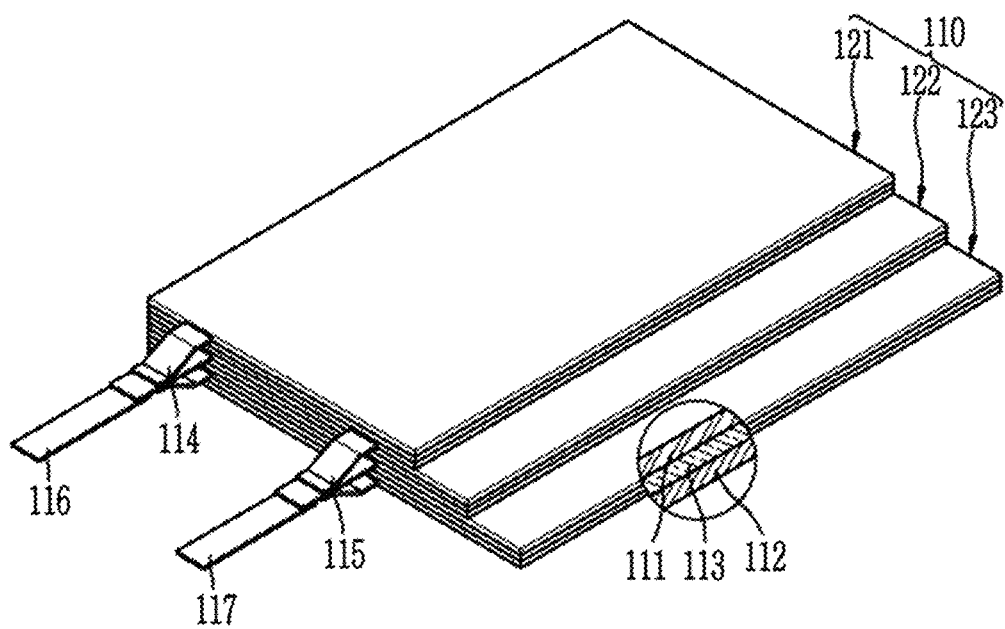
FIG. 6 is a perspective view illustrating the battery part of FIG. 5.

FIG. 5 is a perspective view illustrating a rechargeable lithium battery 100 according to an embodiment, and FIG. 6 is a perspective view illustrating the battery part 110 of FIG. 5. Herein, the rechargeable lithium battery according to an embodiment is described as an example in which a stack-type or kind electrode assembly is placed in a prismatic case, but the present disclosure is not limited thereto. An electrode assembly such as a stack type or kind, a winding type or kind (jelly roll type or kind), a stack-and-fold type or kind, and a Z-fold type or kind may be applied to a battery in the case of a type or kind published in a cylindrical, prismatic, coin type or kind, and/or the like.

Referring to FIGS. 5 and 6, the rechargeable lithium battery 100 according to an embodiment includes a battery part 110, an exterior material 130 accommodating the battery part 110, and a cap plate 160 sealing the exterior material 130.

The battery part 110 includes a first electrode 111, a second electrode 112, and a separator 113 between the first electrode 111 and the second electrode 112. The battery part 110 may be manufactured in a structure in which a first electrode 111, a separator 113, and a second electrode 112 are sequentially stacked.

The battery part 110 is described as an example of a stack type or kind structure in which electrodes having different polarities are stacked on each other, but is not limited to any one of a jelly-roll structure in which electrodes having different polarities are wound in one direction or stack and folding type or kind, which is a mixed type or kind of stack type or kind and jelly-roll type or kind.

The first electrode 111 and the second electrode 112 are formed to have different polarities. When the first electrode 111 is a positive electrode, the second electrode 112 may be a negative electrode, and when the first electrode 111 is a negative electrode, the second electrode 112 may be a positive electrode. Hereinafter, a case in which the first electrode 111 is a positive electrode and the second electrode 112 is a negative electrode will be described.

A first electrode tab 114 may be electrically connected to the first electrode 111. Because the battery part 110 has a stacked structure in which each electrode is separated from each other, the first electrode tab 114 may be drawn out from each of the first electrodes 111. The plurality of first electrode tabs 114 are assembled at one side of the short side of the battery part 110. The plurality of first electrode tabs 114 may all be electrically connected to the first electrode lead 116.

A second electrode tab 115 may be electrically connected to the second electrode 112. Like the first electrode 111, the second electrode tab 115 may be drawn out from each second electrode 112. The plurality of second electrode tabs 115 are uniformly assembled on one side of the short side of the battery part 110 in which the plurality of first electrode tabs 114 are disposed. The plurality of second electrode tabs 115 may all be electrically connected to the second electrode lead 117.

The battery part 110 may include a plurality of unit battery parts 121 to 123. The unit battery parts 121 to 123 may include a first unit battery part 121, a second unit battery part 122, and a third unit battery part 123. Herein, three unit battery parts 121 to 123 are illustrated, but the number of unit battery parts is not limited thereto.

The first to third unit battery parts 121 to 123 may have a structure in which a step is formed on one side of the long side of the battery part 110. However, it may be manufactured in one or more suitable shapes, and for example, the step may be formed on the short side of the battery part 110, or the step may concurrently (e.g., simultaneously) be formed on the short side and long side of the battery part 110. The exterior material 130 may be formed in a shape corresponding to the battery part 110 in order to accommodate the battery part 110 having a step-type or kind structure.

The cap plate 160 may seal an opening of the exterior material 130. A gasket 210 may be installed around the terminal through hole of the cap plate 160.

Hereinafter, descriptions overlapped with the above may not be provided again, and elements constituting the rechargeable lithium battery of the embodiment will be described in more detail.

Positive Electrode

The positive electrode includes a current collector and a positive electrode active material layer formed on the current collector. According to an embodiment, the positive electrode may have a structure in which a current collector, a positive electrode active material layer, a functional layer, and an adhesive layer are stacked in this order.

The positive electrode active material layer may include a positive electrode active material, and may further include a binder and/or a conductive material.

The positive electrode active material may include lithiated intercalation compounds that reversibly intercalate and deintercalate lithium ions. Examples of the positive electrode active material include a compound represented by any one of the following chemical formulas:

$Li_aA_{1-b}X_bD_2$ (0.90≤a≤1.8, 0≤b≤0.5);

$Li_aA_{1-b}X_bO_{2-c}D_c$ (0.90≤a≤1.8, 0≤b≤0.5, 0≤c≤0.05);

$Li_aE_{1-b}X_bO_{2-c}D_c$ (0.90≤a≤1.8, 0≤b≤0.5, 0≤c≤0.05);

$Li_aE_{2-b}X_bO_{4-c}D_c$ (0.90≤a≤1.8, 0≤b≤0.5, 0≤c≤0.05);

$Li_aNi_{1-b-c}Co_bX_cD_\alpha$ (0.90≤a≤1.8, 0≤b≤0.5, 0≤c≤0.5, 0<α≤2);

$Li_aNi_{1-b-c}Co_bX_cO_{2-\alpha}T_\alpha$ (0.90≤a≤1.8, 0≤b≤0.5, 0≤c≤0.05, 0<α≤2);

$Li_aNi_{1-b-c}Co_bX_cO_{2-\alpha}T_2$ (0.90≤a≤1.8, 0≤b≤0.5, 0≤c≤0.05, 0<α≤2);

$Li_aNi_{1-b-c}Mn_bX_cD_\alpha$ (0.90≤a≤1.8, 0≤b≤0.5, 0≤c≤0.05, 0<α≤2);

$Li_aNi_{1-b-c}Mn_bX_cO_{2-\alpha}T_\alpha$ (0.90≤a≤1.8, 0≤b≤0.5, 0≤c≤0.05, 0<α<2);

$Li_aNi_{1-b-c}Mn_bX_cO_{2-\alpha}T_2$ (0.90≤a≤1.8, 0≤b≤0.5, 0≤c≤0.05, 0<α<2);

$Li_aNi_bE_cG_dO_2$ (0.90≤a≤1.8, 0≤b≤0.9, 0≤c≤0.5, 0.001≤d≤0.1);

$Li_aNi_bCo_cMn_dGeO_2$ (0.90≤a≤1.8, 0≤b≤0.9, 0≤c≤0.5, 0≤d≤0.5, 0.001≤e≤0.1);

$Li_aNiG_bO_2$ (0.90≤a≤1.8, 0.001≤b≤0.1);

$Li_aCoG_bO_2$ (0.90≤a≤1.8, 0.001≤b≤0.1);

$Li_aMn_{1-b}G_bO_2$ (0.90≤a≤1.8, 0.001≤b≤0.1);

$Li_aMn_2G_bO_4$ (0.90≤a≤1.8, 0.001≤b≤0.1);

$Li_aMn_{1-g}G_gPO_4$ (0.90≤a≤1.8, 0≤g≤0.5);

$QO_2$; $QS_2$; $LiQS_2$;

$V_2O_5$; $LiV_2O_5$;

$LiZO_2$;

$LiNiVO_4$;

$Li_{(3-f)}J_2(PO_4)_3$ (0≤f≤2);

$Li_{(3-f)}Fe_2(PO_4)_3$ (0≤f≤2);

$Li_aFePO_4$ (0.90≤a≤1.8).

In chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a combination thereof. The coating layer forming process may utilize a method that does not adversely affect the physical properties of the positive electrode active material, for example, spray coating, dipping, and/or the like.

The positive electrode active material may include, for example, a lithium nickel composite oxide represented by Chemical Formula 11.

  Chemical Formula 11

In Chemical Formula 11, 0.9≤a11≤1.8, 0.3≤x11≤1, 0≤y11≤0.7, and $M^{11}$ and $M^{12}$ may each independently be selected from Al, B, Ce, Co, Cr, F, Mg, Mn, Mo, Nb, P, S, Si, Sr, Ti, V, W, Zr, and a combination thereof.

In Chemical Formula 11, 0.4≤x11≤1 and 0≤y11≤0.6; 0.5≤x11≤1 and 0≤y11≤0.5; 0.6≤x11≤1 and 0≤y11≤0.4; 0.7≤x11≤1 and 0≤y11≤0.3; 0.8≤x11≤1 and 0≤y11≤0.2; or 0.9≤x11≤1 and 0≤y11≤0.1.

As a specific example, the positive electrode active material may include a lithium nickel cobalt composite oxide represented by Chemical Formula 12.

  Chemical Formula 12

In Chemical Formula 12, 0.9≤a12≤1.8, 0.3≤x12<1, 0<y12≤0.7, and $M^{13}$ is selected from Al, B, Ce, Cr, F, Mg, Mn, Mo, Nb, P, S, Si, Sr, Ti, V, W, Zr, and a combination thereof.

In Chemical Formula 12, 0.3≤x12≤0.99 and 0.01≤y12≤0.7; 0.4≤x12≤0.99 and 0.01≤y12≤0.6; 0.5≤x12≤0.99 and 0.01≤y12≤0.5; 0.6≤x12≤0.99 and 0.01≤y12≤0.4; 0.7≤x12≤0.99 and 0.01≤y12≤0.3; 0.8≤x12≤0.99 and 0.01≤y12≤0.2; or 0.9≤x12≤0.99 and 0.01≤y12≤0.1.

As a specific example, the positive electrode active material may include a lithium nickel cobalt composite oxide represented by Chemical Formula 13.

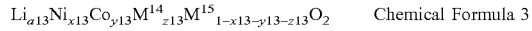  Chemical Formula 3

In Chemical Formula 13, 0.9≤a13≤1.8, 0.3≤x13≤0.98, 0.01≤y13≤0.69, 0.01≤z13≤0.69, $M^{14}$ is selected from Al, Mn, and a combination thereof, and $M^{15}$ is selected from B, Ce, Cr, F, Mg, Mo, Nb, P, S, Si, Sr, Ti, V, W, Zr, and a combination thereof.

In Chemical Formula 13 0.4≤x13≤0.98, 0.01≤y13≤0.59, and 0.01≤z13≤0.59; 0.5≤x13≤0.98, 0.01≤y13≤0.49, and 0.01≤z13≤0.49; 0.6≤x13≤0.98, 0.01≤y13≤0.39, and 0.01≤z13≤0.39; 0.7≤x13≤0.98, 0.01≤y13≤0.29, and 0.01≤z13≤0.29; 0.8≤x13≤0.98, 0.01≤y13≤0.19, and 0.01≤z13≤0.19; or 0.9≤x13≤0.98, 0.01≤y13≤0.09, and 0.01≤z13≤0.09.

A content (e.g., amount) of the positive electrode active material may be about 90 wt % to about 98 wt %, for example, about 90 wt % to about 97 wt %, based on the total weight of the positive electrode active material layer. Each content (e.g., amount) of the binder and the conductive material may be about 1 wt % to about 5 wt % based on the total weight of the positive electrode active material layer.

The binder improves binding properties of positive electrode active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The conductive material is included to provide electrode conductivity. Any electrically conductive material may be utilized as an electron conductive material unless it causes a chemical change in a battery. Examples of the conductive material may include a carbon-based material such as natural graphite, artificial graphite, carbon black, acetylene black, ketjen black, carbon fiber, and/or the like; a metal-based material of a metal powder or a metal fiber including copper, nickel, aluminum, silver, and/or the like; a conductive polymer such as a polyphenylene derivative, and/or the like; or a mixture thereof.

An aluminum foil may be utilized as the positive electrode current collector but is not limited thereto.

Negative Electrode

The negative electrode includes a current collector and a negative electrode active material layer formed on the current collector and including a negative electrode active material. According to an embodiment, the negative electrode may have a structure in which a current collector, a negative electrode active material layer, a functional layer, and an adhesive layer are sequentially stacked. In particular, the negative electrode is an electrode of the above-described embodiment, and may further include an inner coating layer filled in the internal pores of the electrode active material layer and including an adhesive material; and an outer coating layer disposed on the surface of the electrode active material layer and including an adhesive material that is the same as or different from the inner coating layer. In some embodiments, the total weight of the inner coating layer and the outer coating layer per area of one surface of the current collector may be about 0.1 g/m² to about 0.7 g/m², and the electrode active material layer may have a porosity of about 13% to about 16% in a cross section having a depth of about 20 μm from the surface of the electrode active material layer to the current collector.

The negative electrode active material includes a material capable of reversibly intercalating/deintercalating lithium ions, lithium metal, an alloy of lithium metal, a material capable of doping and dedoping lithium, or a transition metal oxide.

The material that reversibly intercalates/deintercalates lithium ions may include, for example crystalline carbon, amorphous carbon, or a combination thereof as a carbon-based negative electrode active material. The crystalline carbon may be non-shaped, or sheet, flake, spherical, or fiber shaped natural graphite or artificial graphite. The amorphous carbon may be a soft carbon, a hard carbon, a mesophase pitch carbonization product, calcined coke, and/or the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a Si-based negative electrode active material or a Sn-based negative electrode active material. The Si-based negative electrode active material may include silicon, a silicon-carbon composite, $SiO_x$ ($0<x<2$), and a Si-Q alloy (wherein Q is an alkali metal, an alkaline-earth metal, a Group 13 element, a Group 14 element, a Group 15 element, a Group 16 element, a transition metal, a rare earth element, and a combination thereof, but not Si) and the Sn-based negative electrode active material may include Sn, $SnO_2$, and a Sn—R alloy (wherein R is an alkali metal, an alkaline-earth metal, a Group 13 element, a Group 14 element, a Group 15 element, a Group 16 element, a transition metal, a rare earth element, or a combination thereof, but not Sn). At least one of these materials may be mixed with $SiO_2$. Each of the elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, or a polymer resin such as a phenol resin, a furan resin, or a polyimide resin. In this case, a content (e.g., amount) of silicon may be about 10 wt % to about 50 wt % based on the total weight of the silicon-carbon composite. In some embodiments, a content (e.g., amount) of the crystalline carbon may be about 10 wt % to about 70 wt % based on the total weight of the silicon-carbon composite, and a content (e.g., amount) of the amorphous carbon may be about 20 wt % to about 40 wt % based on the total weight of the silicon-carbon composite. In some embodiments, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may exist in an oxidized form, and in this case, an atomic content (e.g., amount) ratio of Si:O in the silicon particles indicating a degree of oxidation may be a weight ratio of about 99:1 to about 33:67. The silicon particles may be $SiO_x$ particles, and in this case, the range of x in $SiO_x$ may be greater than about 0 and less than about 2. In the present specification, unless otherwise defined, an average particle diameter (D50) indicates a diameter of particles having a cumulative volume of about 50 volume % in the particle size distribution.

The Si-based negative electrode active material or Sn-based negative electrode active material may be mixed with the carbon-based negative electrode active material. When the Si-based negative electrode active material or Sn-based negative electrode active material and the carbon-based negative electrode active material are mixed and utilized, the mixing ratio may be a weight ratio of about 1:99 to about 90:10.

In the negative electrode active material layer, the negative electrode active material may be included in an amount of about 95 wt % to about 99 wt % based on the total weight of the negative electrode active material layer.

In an embodiment, the negative electrode active material layer further includes a binder, and may optionally further include a conductive material. The content (e.g., amount) of the binder in the negative electrode active material layer may be about 1 wt % to about 5 wt % based on the total weight of the negative electrode active material layer. In some embodiments, when the conductive material is further included, the negative electrode active material layer may include about 90 wt % to about 98 wt % of the negative electrode active material, about 1 wt % to about 5 wt % of the binder, and about 1 wt % to about 5 wt % of the conductive material.

The binder serves to well adhere the negative electrode active material particles to each other and also to adhere the negative electrode active material to the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is utilized as the negative electrode binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and utilized. As the alkali metal, Na, K or Li may be utilized. An amount of the thickener utilized may be about 0.1 parts by weight to about 3 parts by weight based on 100 parts by weight of the negative electrode active material.

The conductive material is included to provide electrode conductivity. Any electrically conductive material may be utilized as a conductive material unless it causes a chemical change in a battery. Examples of the conductive material include a carbon-based material such as natural graphite, artificial graphite, carbon black, acetylene black, ketjen black, a carbon fiber, carbon nanotube, and/or the like; a metal-based material of a metal powder or a metal fiber including copper, nickel, aluminum silver, and/or the like; a conductive polymer such as a polyphenylene derivative; or a mixture thereof.

The negative electrode current collector may include at least one selected from a copper foil, a nickel foil, a stainless steel foil, a titanium foil, a nickel foam, a copper foam, a polymer substrate coated with a conductive metal, and a combination thereof.

Separator

The separator separates a positive electrode and a negative electrode and provides a transporting passage for lithium ions and may be any generally-utilized separator in a lithium ion battery. In other words, it may have low resistance to ion transport and excellent or suitable impregnation for an electrolyte. For example, separator may be selected from a glass fiber, polyester, Teflon, polyethylene, polypropylene, polytetrafluoroethylene, or a combination thereof. It may have a form of a non-woven fabric or a woven fabric. For example, in a lithium ion battery, a polyolefin-based polymer separator such as polyethylene and polypropylene is mainly utilized. In order to ensure the heat resistance or mechanical strength, a coated separator including a ceramic component or a polymer material may be utilized. Optionally, it may have a mono-layered or multi-layered structure.

Electrolyte

The electrolyte includes a non-aqueous organic solvent and a lithium salt.

The non-aqueous organic solvent serves as a medium for transmitting ions taking part in the electrochemical reaction of a battery. The non-aqueous organic solvent may be a carbonate-based, ester-based, ether-based, ketone-based, or alcohol-based solvent, or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. Examples of the ester-based solvent include methyl acetate, ethyl acetate, n-propyl acetate, dimethyl acetate, methyl propionate, ethyl propionate, γ-butyrolactone, decanolide, valerolactone, mevalonolactone, caprolactone, and/or the like. The ether-based solvent may be dibutyl ether, tetraglyme, diglyme, dimethoxyethane, 2-methyltetrahydrofuran, tetrahydrofuran, and/or the like and the ketone-based solvent may be cyclohexanone, and/or the like. In some embodiments, the alcohol-based solvent may be ethyl alcohol, isopropyl alcohol, etc. and the aprotic solvent may be nitriles such as R—CN (where R is a C2 to C20 linear, branched, or cyclic hydrocarbon group and may include a double bond, an aromatic ring, or an ether bond), amides such as dimethylformamide, dioxanes such as 1,3-dioxolane, sulfolanes, and/or the like.

The non-aqueous organic solvent may be utilized alone or in a mixture. When the organic solvent is utilized in a mixture, the mixture ratio may be controlled or selected in accordance with a desirable battery performance.

In some embodiments, in the case of the carbonate-based solvent, a mixture of a cyclic carbonate and a chain carbonate may be utilized. In this case, when the cyclic carbonate and the chain carbonate are mixed in a volume ratio of about 1:1 to about 1:9, the electrolyte may exhibit excellent or suitable performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

As the aromatic hydrocarbon-based solvent, an aromatic hydrocarbon-based compound represented by Chemical Formula I may be utilized.

Chemical Formula I

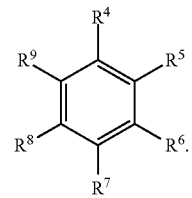

In Chemical Formula I, $R^4$ to $R^9$ may each independently be the same or different and are selected from hydrogen, a halogen, a C1 to C10 alkyl group, a haloalkyl group, and a combination thereof.

Specific examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of Chemical Formula II in order to improve cycle-life of a battery.

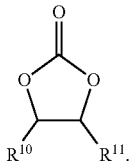

Chemical Formula II

In Chemical Formula II, $R^{10}$ and $R^{11}$ may each independently be the same or different, and are selected from hydrogen, a halogen, a cyano group, a nitro group, and fluorinated C1 to C5 alkyl group, provided that at least one of $R^{10}$ and $R^{11}$ is selected from a halogen, a cyano group, a nitro group, and fluorinated C1 to C5 alkyl group, but both (e.g., simultaneously) of $R^{10}$ and $R^{11}$ are not hydrogen.

Examples of the ethylene-based carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving cycle-life may be utilized within an appropriate or suitable range.

The lithium salt dissolved in the non-organic solvent supplies lithium ions in a battery, enables a basic operation of a rechargeable lithium battery, and improves transportation of the lithium ions between positive and negative electrodes.

Examples of the lithium salt include at least one selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, an integer in a range of 1 to 20, lithium difluoro(bisoxalato) phosphate, LiCl, LiI, $LiB(C_2O_4)_2$ (lithium bis(oxalato) borate: LiBOB), and lithium difluoro(oxalato)borate (LiDFOB).

The lithium salt may be utilized in a concentration in a range of about 0.1 M to about 2.0 M. When the lithium salt is included at the above concentration range, an electrolyte may have excellent or suitable performance and lithium ion mobility due to optimal or suitable electrolyte conductivity and viscosity.

Rechargeable lithium batteries may be classified as lithium ion batteries, lithium ion polymer batteries, and lithium polymer batteries according to the presence of a separator and the type or kind of electrolyte utilized therein. The rechargeable lithium batteries may have a variety of shapes and sizes, and include cylindrical, prismatic, coin, or pouch-type or kind batteries, and may be thin film batteries or may be rather bulky in size. Because the structure and manufacturing method of these batteries have been described above or are widely suitable in the art, a detailed description thereof will not be provided.

Hereinafter, examples of the present disclosure and comparative examples are described. It is to be understood, however, that the examples are for the purpose of illustration and are not to be construed as limiting the present disclosure.

Example 1 (Coating Material (Adhesive Layer) Loading Amount Per Area of One Surface of Current Collector: 0.2 g/m²)

(1) Manufacture of Negative Electrode

In water as a solvent, 97.0 wt % of graphite as a negative electrode active material, 0.5 wt % of a conductive material, 0.8 wt % of carboxylmethyl cellulose, and 1.7 wt % of styrenebutadiene rubber were mixed, preparing negative electrode active material slurry. The negative electrode active material slurry was coated on both (e.g., opposite) surfaces of an 8 μm-thick copper current collector and then, dried and roll-pressed, forming a negative electrode active material layer. Herein, the coating method of the negative electrode active material slurry was performed by utilizing die coating, and after forming the negative electrode active material layer, a total thickness (i.e., a total thickness of a negative electrode with a structure of negative electrode active material layer/copper current collector/negative electrode active material layer) was 220 μm.

In water as a solvent, 75 wt % of acryl-based polymer particles with an average particle diameter (D50) of 500 nm (Zeon Chemicals L.P.) as an adhesive material and 25 wt % of fluorine-based polymer particles with an average particle diameter (D50) of 250 nm (Solvay Chemicals, Inc.) as a filler were mixed to prepare a solution for forming a coating layer. The solution for forming a coating layer was coated on the negative electrode active material layer through electrospinning by utilizing an electrospinning device at a flow rate of 2.0 mL/min at a progress rate of 650 cm/min under a voltage condition of 40 kV.

Accordingly, an inner coating layer filled in internal pores of the negative electrode active material layer and including the adhesive material and the filler; and an outer coating layer disposed on the surface of the electrode active material layer and including the same adhesive material as the inner coating layer and the filler were formed. Accordingly, a negative electrode of Example 1 was obtained.

In the negative electrode of Example 1, a loading amount of the negative electrode coating material per area of one surface of the current collector, that is, a total weight of the inner coating layer and the outer coating layer was 0.2 g/m².

(2) Manufacture of Positive Electrode 95 wt % of $LiCoO_2$ as a positive electrode active material, 3 wt % of polyvinylidene fluoride as a binder, and 2 wt % of ketjen black as a conductive material were mixed in an N-methylpyrrolidone solvent, preparing positive electrode active material slurry. The positive electrode active material slurry was coated on both (e.g., opposite) surfaces of a 12 μm-thick aluminum current collector, dried, and roll-pressed, forming a positive electrode active material layer.

Herein, the coating method of the positive electrode active material slurry was die coating, and after forming the positive electrode active material layer, a total thickness (i.e., a total thickness of a positive electrode with a structure of positive electrode active material layer/aluminum current collector/positive electrode active material layer structure) was 154 μm.

(3) Manufacture of Battery Cell

A polyethylene separator (thickness: 14 μm) ceramic-coated on both (e.g., opposite) sides was prepared and inserted between the negative electrode and the positive electrode and then, assembled therewith. Herein, the coated surface of the negative electrode was in contact with the separator.

The electrode assembly was inserted into a can, and an electrolyte solution prepared by dissolving 1.15 M of $LiPF_6$ lithium salt in a mixed solvent of ethylene carbonate, ethylmethyl carbonate, and dimethyl carbonate in a volume ratio of 20:40:40 was injected thereinto, manufacturing a rechargeable lithium battery cell.

Example 2 (Coating Material (Adhesive Layer) Loading Amount Per Area of One Surface of Current Collector: 0.4 $g/m^2$)

(1) Manufacture of Negative Electrode

A negative electrode of Example 2 was manufactured in substantially the same manner as in Example 1 except that the electrospinning was performed at 3.0 mL/min.

In the negative electrode of Example 2, a loading amount of a negative electrode coating material per area of one surface of the current collector, that is, a total weight of the inner coating layer and the outer coating layer was 0.4 $g/m^2$.

(2) Manufacture of Positive Electrode

A positive electrode was manufactured in substantially the same manner as in Example 1.

(3) Manufacture of Battery Cell

A rechargeable lithium battery cell was manufactured in substantially the same manner as in Example 1 except that the negative electrode of Example 2 was utilized instead of the negative electrode of Example 1.

Example 3 (Coating Material (Adhesive Layer) Loading Amount Per Area of One Surface of Current Collector: 0.6 $g/m^2$)

(1) Manufacture of Negative Electrode

The negative electrode of Example 3 was manufactured in substantially the same manner as in Example 1 except that the electrospinning was performed at 4.0 mL/min.

In the negative electrode of Example 2, a loading amount of a negative electrode coating material per one surface of the current collector, that is, a total weight of the inner coating layer and the outer coating layer was 0.6 $g/m^2$.

(2) Manufacture of Positive Electrode

A positive electrode was manufactured in substantially the same manner as in Example 1.

(3) Manufacture of Battery Cell

A rechargeable lithium battery cell was manufactured in substantially the same manner as in Example 1 except that the negative electrode of Example 3 was utilized instead of the negative electrode of Example 1.

Comparative Example 1 (Adhesive Layer Loading Amount Per Area of One Surface of Separator: 0.2 $g/m^2$)

(1) Manufacture of Negative Electrode

A negative electrode active material layer was formed on one surface of a copper foil in substantially the same manner as in Example 1. A negative electrode of Comparative Example 1 was obtained by forming the negative electrode active material layer on one surface of the copper foil without forming an inner coating layer and an outer coating layer.

(2) Manufacture of Positive Electrode

A positive electrode was manufactured in substantially the same manner as in Example 1.

(3) Manufacture of Separator

A 14 μm-thick MCS adhesive separator (Samsung SDI Co., Ltd.) was utilized. For example, the MCS adhesive separator had each ceramic layer coated on both (e.g., opposite) sides of a polyethylene fabric, and a loading amount of each ceramic layer was 5.0 $g/m^2$. In some embodiments, an adhesive layer was coated on both (e.g., opposite) sides of the ceramic-coated separator, and a loading amount of the adhesive layer per area of one side was 0.2 $g/m^2$.

(4) Manufacture of Battery Cell

The MCS adhesive separator was interposed between the negative electrode and the positive electrode and then, assembled. Herein, the coated surface of the MCS adhesive separator was in contact with the negative electrode.

The electrode assembly was housed in a can, and an electrolyte solution prepared by adding 1.15 M of $LiPF_6$ lithium salt to a mixed solvent of ethylene carbonate, ethylmethyl carbonate, and dimethyl carbonate in a volume ratio of 20:40:40, manufacturing a rechargeable lithium battery cell.

Evaluation Example 1: Porosity

Each negative electrode according to Examples 1 to 3 and Comparative Example 1 was evaluated with respect to porosity according to a depth of an electrode active material layer, and the results are shown in Table 1.

For example, a cross-section polisher (Gatan Inc.) was utilized to prepare a cross-section of each sample for measurement, and the cross-section was taken an image of by utilizing a scanning electron microscope (SEM, S-4800, Hitachi Ltd.) in a BSE mode. Subsequently, an Image J program was utilized to measure porosity (% Area) thereof. Herein, the "porosity according to a depth of an electrode active material layer" refers to "porosity in the cross section at a specific depth from the surface of the electrode active material layer."

TABLE 1

| Depth | Example 1 | Example 2 | Example 3 | Comparative Example 1 (Ref.) |
|---|---|---|---|---|
| 10 μm | 11.07% | 11.14% | 11.87% | 9.15% |
| 15 μm | 13.02% | 13.40% | 15.47% | 11.48% |
| 20 μm | 13.23% | 14.56% | 15.01% | 11.53% |
| 25 μm | 13.73% | 15.2% | 15.97% | 12.18% |
| 30 μm | 13.43% | 14.82% | 14.95% | 12.73% |
| 40 μm | 13.78% | 14.4% | 14.47% | 12.7% |

Referring to Table 1, Comparative Example 1, in which a separator was coated with an adhesive material, and the coated surface of the separator was in contact with a negative electrode, was utilized as comparison reference (Reference, Ref.), because the adhesive material was not filled in internal pores of the negative electrode during the manufacturing process. In Table 1, porosity of each electrode active material layer of Examples 1 to 3 was increased, compared with Comparative Example 1 (Ref.), when a depth from the surface of the electrode active material layer to the current collector was the same. This refers to that when an adhesive material was coated on a negative electrode the through electrospinning, a spring back of the negative electrode active material layer occurred at a local site where an aqueous solution including the adhesive material was in contact, which releases stress of the negative electrode active material layer and concurrently (e.g., simultaneously), generates internal pores of the negative electrode active material layer or increases a size of the already created internal pores.

In some embodiments, each electrode active material layer of Examples 1 to 3, from the surface of the electrode active material layer to the cross section with a depth of 20 μm to the current collector, exhibited a gradual increase in porosity as the depth increased. For example, the total weight of the inner coating layer and the outer coating layer per area of one surface of the current collector was about 0.1 g/m² to about 0.7 g/m², and the electrode active material layer had porosity of about 13% to about 16% in a cross section having a depth of about 20 μm from the surface of the electrode active material layer to the current collector.

Furthermore, each electrode active material layer of Examples 1 to 3, when they had the same depth from the surface of the electrode active material layer to the current collector, exhibited a gradual increase in porosity, as a total weight of the inner coating layer and the outer coating layer per area of one surface of the current collector increased. For example, the porosity in a cross section having a depth of about 20 μm from the surface of the electrode active material layer to the current collector was 15% to 16% when the total weight of the inner coating layer and the outer coating layer per area of one surface of the current collector was 0.5 g/m² to 0.7 g/m²; 14% to 15% when the total weight of the inner coating layer and the outer coating layer per area of one surface of the current collector was 0.3 g/m² to 0.5 g/m²; and 13% to 14% when the total weight of the inner coating layer and the outer coating layer per area of one surface of the current collector was 0.1 g/m² to 0.3 g/m².

Evaluation Example 2: Expansion Rate of Negative Electrode

Each negative electrode of Examples 1 to 3 and Comparative Example 1 was evaluated with respect to an expansion rate, and the results are shown in Table 2.

For example, the negative electrode was measured with respect to a thickness before and after the coating and then, after assembled into a rechargeable lithium battery cell, charged to an upper limit voltage of 4.25 V under CC/CV of 0.33 C at 25° C. to a full charge (SOC 100%), and disassembled, remeasured with respect to a thickness, which were utilized to calculate a negative electrode expansion rate according to Equation 1-1.

$$100\%*([T_{B1}]-[T_{A1}])/[T_A] \leq 20\%$$ [Equation 1-1]

In Equation 1-1, $[T_{A1}]$ is an initial thickness of the negative electrode; and $[T_{B1}]$ is a thickness of the negative electrode after the state of charge (SOC) of a rechargeable lithium battery cell including the negative electrode reaches 100%.

TABLE 2

| | Thickness of negative electrode (μm) | | | Expansion rate of negative electrode (%) |
|---|---|---|---|---|
| | Before coating | After coating | SOC 100% | |
| Example 1 | 218 | 226 | 260.3 | 15.2 |
| Example 2 | 218 | 227 | 260.3 | 14.7 |
| Example 3 | 218 | 228 | 263.2 | 15.4 |
| Comparative Example 1 | 218 | 218 | 262.0 | 20.2 |

In Table 2, compared with Comparative Example 1 in which a separator was coated with an adhesive material, and the coated surface of the separator was in contact with a negative electrode, Examples 1 to 3, in which a negative electrode was coated with an adhesive material, and the coated surface thereof was attached to a separator, exhibited a significantly low negative electrode expansion rate. For example, the negative electrode of Comparative Example 1 exhibited an expansion rate of greater than 20% according to Equation 1-1, but each negative electrode of Examples 1 to 3 exhibited an expansion rate of less than or equal to 20% and specifically, less than or equal to 17.5% according to Equation 1-1. On the other hand, in each negative electrode of Examples 1 to 3, as the total weight of the inner coating layer and the outer coating layer per area of one surface of the current collector increased, the overall porosity of the electrode active material layer increased, but electrode expansion rates according to the full charge (SOC 100%) of the rechargeable lithium battery cells were the same. Accordingly, a negative electrode is necessary to design by comprehensively considering porosity of a negative electrode active material layer, an expansion rate of the negative electrode, an adhesive force between the negative electrode and a separator, resistance of the negative electrode, initial discharge capacity of a rechargeable lithium battery, and/or the like.

Evaluation Example 3: Negative Electrode-Separator Adhesive Force

Each rechargeable lithium battery cell according to Examples 1 to 3 and Comparative Example 1 was evaluated with respect to an adhesive force between negative electrode and separator, and the results are shown in Table 3.

For example, the negative electrode active material layer and the separator of the rechargeable lithium battery cell were heat-pressed (HP) by utilizing HP equipment at 90° C. with 400 kgf for 120 sec. Subsequently, the end of the negative electrode active material layer of the adhered battery cell was mounted on a peel tester (KP-M1T-s, KIPAE E&T Co., Ltd.), and a force, as much as a length of 50 mm with a 1 kg load cell at 100 mm/min and to a temperature of 180° C., was applied thereto to measure a force required to peel the negative electrode active material layer and the separator.

TABLE 3

| | Adhesive force (gf/mm) |
|---|---|
| Example 1 | 0.12 |
| Example 2 | 0.19 |
| Example 3 | 0.21 |
| Comparative Example 1 | 0.08 |

Referring to Table 3, compared with Comparative Example 1 in which a separator was coated with an adhesive material, and a negative electrode was attached to the coated surface, Examples 1 to 3, in which a negative electrode was coated with an adhesive material, and a separator was attached to the coated surface, exhibited significantly high adhesive force of the negative electrode.

Evaluation Example 4: Electrochemical Characteristics of Rechargeable Lithium Battery Cells The rechargeable lithium battery cells according to Examples 1 to 3 and Comparative Example 1 were evaluated with respect to electrochemical characteristics, and the results are shown in Table 4.

For example, the cells were charged to an upper limit voltage of 4.25 V at 0.33 C to a full charge (SOC 100%) at 25° C. and allowed to stand in a 60° C. chamber and then, measured with respect to capacity every 30 days. Then, the cells were paused for 4 hours at 25° C. and discharged at 0.33 C and then, checked with respect to capacity. This process was performed every 30 days for a total of 90 days The cells were measured with respect to capacity before allowed to stand and then, remeasured with respect to capacity after 90 days.

In some embodiments, according to Equation 2, a ratio of discharge capacity at the 90th cycle relative to discharge capacity at the $1^{st}$ cycle (i.e., capacity retention) was calculated.

90 day capacity retention rate (%)=100×[discharge capacity after 90 days/discharge capacity after 1 day]     [Equation 2]

TABLE 4

|  | Initial (1 day) discharge capacity (mAh) @ 60° C. | Capacity retention after 90 days (%) @ 60° C. |
|---|---|---|
| Example 1 | 6922 | 95.1 |
| Example 2 | 6915 | 95.4 |
| Example 3 | 6914 | 95.5 |
| Comparative Example 1 | 6898 | 86.8 |

Referring to Table 4, Referring to Table 3, compared with Comparative Example 1 in which a separator was coated with an adhesive material, and a negative electrode was attached to the coated surface, each rechargeable lithium battery cell of Examples 1 to 3, in which a negative electrode was coated with an adhesive material, and a separator was attached on the coated surface, exhibited significantly high storage characteristics at a high temperature.

While this disclosure has been described in connection with what is presently considered to be practical example embodiments, it is to be understood that the present disclosure is not limited to the disclosed embodiments. In contrast, it is intended to cover one or more suitable modifications and equivalent arrangements included within the spirit and scope of the appended claims, and equivalents thereof.

As used herein, the term "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the terms "use," "using," and "used" may be considered synonymous with the terms "utilize," "utilizing," and "utilized," respectively.

The use of "may" when describing embodiments of the present disclosure refers to "one or more embodiments of the present disclosure."

As used herein, the singular forms "a", "an" and "the" are intended to include the plural forms as well, unless the context clearly indicates otherwise.

In the present disclosure, when particles are spherical, "size" or "diameter" indicates a particle diameter or an average particle diameter, and when the particles are non-spherical, the "size" or "diameter" indicates a major axis length or an average major axis length. That is, when particles are spherical, "diameter" indicates a particle diameter or an average particle diameter, and when the particles are non-spherical, the "diameter" indicates a major axis length or an average major axis length. The size or diameter of the particles may be measured utilizing a scanning electron microscope or a particle size analyzer. As the particle size analyzer, for example, HORIBA, LA-950 laser particle size analyzer, may be utilized. When the size of the particles is measured utilizing a particle size analyzer, the average particle diameter (or size) is referred to as D50. D50 refers to the average diameter (or size) of particles whose cumulative volume corresponds to 50 vol % in the particle size distribution (e.g., cumulative distribution), and refers to the value of the particle size corresponding to 50% from the smallest particle when the total number of particles is 100% in the distribution curve accumulated in the order of the smallest particle size to the largest particle size.

As used herein, expressions such as "at least one of", "one of", and "selected from", when preceding a list of elements, modify the entire list of elements and do not modify the individual elements of the list. For example, "at least one of a, b or c", "at least one selected from a, b and c", etc., may indicate only a, only b, only c, both (e.g., simultaneously) a and b, both (e.g., simultaneously) a and c, both (e.g., simultaneously) b and c, all of a, b, and c, or variations thereof.

The vehicle, a battery management system (BMS) device, and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the present disclosure.

DESCRIPTION OF SYMBOLS

100: rechargeable lithium battery
110: battery part
111: first electrode
112: second electrode
113: separator
114: first electrode tab
115: second electrode tab
116: first electrode lead
117: second electrode lead
121: first unit battery part
122: second unit battery part
123: third unit battery part
130: external material
150: current collector
160: cap plate
161: electrode active material
162: adhesive material
190: electrode pin
210: gasket

What is claimed is:

1. An electrode, comprising
a current collector;
an electrode active material layer on a surface of the current collector and comprising internal pores;
an inner coating layer filled in the internal pores of the electrode active material layer and comprising an adhesive material; and
an outer coating layer on a surface of the electrode active material layer and comprising the adhesive material,
wherein a total weight of the inner coating layer and the outer coating layer per area of one surface of the current collector is about 0.1 $g/m^2$ to about 0.7 $g/m^2$, and
the electrode active material layer has a porosity of about 13% to about 16% in a cross section having a depth of about 20 μm from the surface of the electrode active material layer to the current collector, wherein the porosity increases as the total weight of the inner coating layer and the outer coating layer per area of one surface of the current collector increases.

2. The electrode of claim 1, wherein
the porosity increases as the depth increases from the surface of the electrode active material layer to the cross section having the depth of about 20 μm to the current collector.

3. The electrode of claim 1, wherein
the electrode active material layer has a porosity of about 10% to about 12% in a cross section having a depth of about 10 μm from the surface of the electrode active material layer to the current collector.

4. The electrode of claim 1, wherein
the electrode active material layer has a porosity of about 13% to about 16% in a lower portion of the cross section having the depth of about 20 μm from the surface of the electrode active material layer to the current collector.

5. The electrode of claim 1, wherein
the electrode active material layer has a porosity of about 13% to about 16% porosity in a cross section having a depth of about 30 μm from the surface of the electrode active material layer to the current collector.

6. The electrode of claim 1, wherein
the porosity of the cross section having the depth of about 20 μm from the surface of the electrode active material layer to the current collector
is about 15% to about 16% when the total weight of the inner coating layer and the outer coating layer per area of one surface of the current collector is about 0.5 to about 0.7 $g/m^2$,
is about 14% to about 15% when the total weight of the inner coating layer and the outer coating layer per area of one surface of the current collector is about 0.3 to about 0.5 $g/m^2$, and
is about 13 to about 14% when the total weight of the inner coating layer and the outer coating layer per area of one surface of the current collector is about 0.1 to about 0.3 $g/m^2$.

7. The electrode of claim 1, wherein
a thickness of the outer coating layer is about 0.5 μm to about 2 μm.

8. The electrode of claim 1, wherein
the inner coating layer and the outer coating layer is formed by electrospinning.

9. The electrode of claim 8, wherein
the electrospinning is performed by electrospinning of an aqueous solution comprising the adhesive material under conditions of a flow rate of about 1.0 ml/min to about 5.0 ml/min, a progress rate of about 400 cm/min to about 1000 cm/min, and a voltage of about 30 kV to about 50 kV.

10. The electrode of claim 1, wherein
the adhesive material comprises an acryl-based polymer.

11. The electrode of claim 1, wherein
the adhesive material is in particle form, and a D50 particle diameter of the adhesive material is about 350 nm to about 650 nm.

12. The electrode of claim 1, wherein
the inner coating layer and the outer coating layer each further comprises a filler.

13. The electrode of claim 12, wherein
the filler comprises a fluorine-based polymer.

14. The electrode of claim 12, wherein
the filler is in particle form, and a D50 particle diameter of the filler is about 100 nm to about 400 nm.

15. The electrode of claim 1, wherein
the electrode active material layer further comprises a conductive material, a binder, or a combination thereof.

16. The electrode of claim 1, wherein the electrode satisfies Equation 1:

$$100\% * ([T_B]-[T_A])/[T_A] \leq 20\% \qquad \text{Equation 1}$$

wherein, in Equation 1,
[$T_A$] is an initial thickness of the electrode; and
[$T_B$] is a thickness of the electrode after a state of charge (SOC) of a rechargeable lithium battery comprising the electrode reaches 100%.

17. The electrode of claim 1, wherein the electrode is a negative electrode.

18. A rechargeable lithium battery, comprising
a positive electrode;
a negative electrode; and
an electrolyte,
wherein at least one of the positive electrode or the negative electrode is the electrode of claim 1.

* * * * *